United States Patent [19]

Pottinger et al.

[11] 4,100,955
[45] Jul. 18, 1978

[54] PNEUMATIC TIRE

[75] Inventors: Marion G. Pottinger, Akron; Edward G. Miller, Jr., Uniontown; Charles Patrick, Tallmadge, all of Ohio

[73] Assignee: The B. F. Goodrich Company, Akron, Ohio

[21] Appl. No.: 804,668

[22] Filed: Jun. 8, 1977

[51] Int. Cl.² .............................................. B60C 15/06
[52] U.S. Cl. ........................... 152/362 CS; 152/353 R; 152/354 RB
[58] Field of Search ............... 152/352 R, 353 R, 354, 152/355, 356, 362 R, 362 CS

[56] References Cited

U.S. PATENT DOCUMENTS

| | | | |
|---|---|---|---|
| 3,062,259 | 11/1962 | Boussu et al. | 152/356 |
| 3,253,636 | 5/1966 | Travers | 152/354 |
| 3,386,486 | 6/1968 | Kovac et al. | 152/354 |
| 3,480,065 | 11/1969 | Verdier | 152/353 |
| 3,557,860 | 1/1971 | Maiocchi | 152/362 R |
| 3,736,973 | 6/1973 | Mezzanotte et al. | 152/356 |
| 3,888,292 | 6/1975 | Menell et al. | 152/362 R |
| 3,946,785 | 3/1976 | Powers et al. | 152/354 |
| 3,961,657 | 6/1976 | Chrobak | 152/355 |
| 3,964,533 | 6/1976 | Arimura et al. | 152/362 R |
| 4,047,551 | 9/1977 | Mezzanotte et al. | 152/355 |

Primary Examiner—Drayton E. Hoffman
Assistant Examiner—Carl Rowold
Attorney, Agent, or Firm—William A. Shira, Jr.; Harry F. Pepper, Jr.

[57] ABSTRACT

A pneumatic tire of the type comprising a carcass reinforced by radially extending cords, surmounted in the crown region by a substantially inextensible belt, reduces rim stress by virtue of having bias angle cord reinforcements in the lower sidewalls and the terminal portions of all radially extending carcass cords turned axially outwardly. Further reduction of rim stress by the tire is effected by employing a belt construction that resists bending.

13 Claims, 5 Drawing Figures

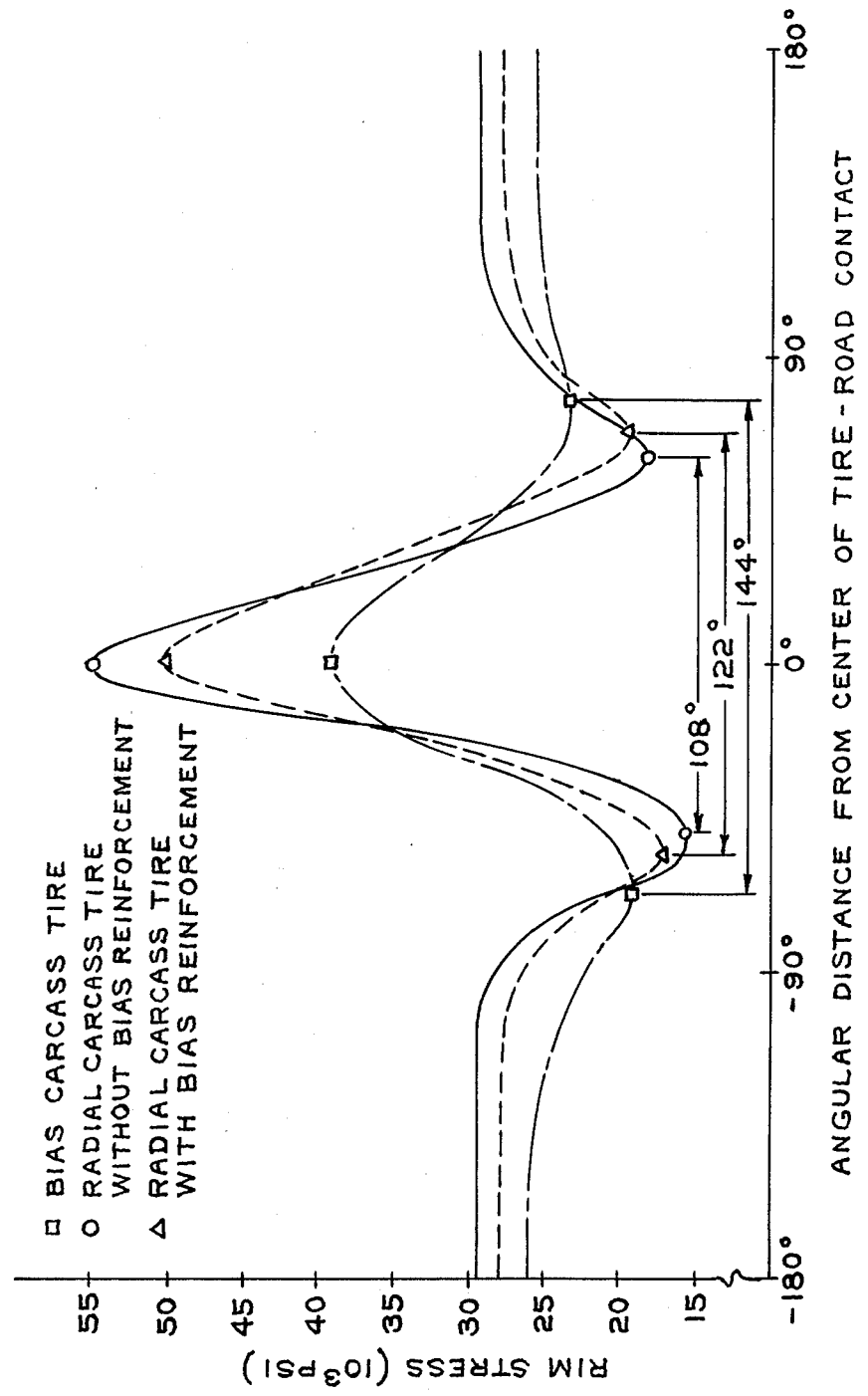

PNEUMATIC TIRE

BACKGROUND OF THE INVENTION

Pneumatic tires for vehicles can be classified into two general types: (1) the so-called bias in which the carcass reinforcing cords extend diagonally relative to the circumferential midplane of the tire; and (2) the radial in which the carcass reinforced cords extended essentially 90° relative to the circumferential midplane of the tire. The radial type tires have a number of important advantages over bias tires among which are improved rate of tread wear and less power loss. However, it has been found that tires in which the principal or only sidewall reinforcement is provided by essentially radially extending cords subject the wheel rims on which the tires are mounted to greater stresses than do bias tires of the same size. This has not been of material consequence for tires of the smaller sizes employed upon many passenger vehicles. However, it has been found that in tires of the size employed upon light utility vehicles, such as vans, pickup trucks and the like, the rim stresses generated by radial tires can exceed the structural strength of the conventional rims, with the result of possible failure of the rim especially in the well region when the rims are of the drop center type and are constructed by welding two or more components together. The problem has been especially acute for rims of the so-called tapered bead type, adapted to receive tubeless tires, on wheels of the 16.5 inches diameter size employed for light duty utility vehicles.

A similar defect had not been experienced with rims of the same type employed with bias carcass tires of like size probably because the diagonal disposition of the carcass cords results in distributing the stresses over a larger arc of the rim circumference and, hence, the load is not concentrated to the same extent as occurs when the carcass reinforcement is essentially radial.

SUMMARY OF THE INVENTION

The invention can be briefly summarized as residing in a pneumatic tire comprising a generally toroidal carcass including a generally cylindrical crown portion and a pair of convex sidewalls terminating in axially spaced beads, with each bead including an annular bead core, the said carcass reinforced by generally radially extending reinforcing cords surmounted in the crown region by a substantially inextensible belt formed of at least two plies of parallel cords extending at an angle to the circumferential center line of the tire, and with the sidewalls and crown portions of the carcass covered by elastomer, characterized in that each sidewall includes first and second annular reinforcing portions formed of cords extending respectively at opposite acute angles relative to the circumference of the base of the adjacent bead with an annular filler of elastomer, generally triangular in cross section, positioned between said portions adjacent the bead core and extending into the tire sidewall to a location intermediate the radially outer edges of the said portions, the end regions of all of said radially extending cords being turned axially outwardly.

The reinforcing portions, comprising the cords extending at acute angles relative to the circumference of the base of the beads of the tire, act to spread the load transmitted by each radial cord of the carcass over a greater arcuate portion of the rim thereby lowering the localized peak stresses, the load being distributed in a manner approximating that which is achieved in a conventional bias tire. Preferably, the cords which extend at acute angles in the lower sidewall regions of the tire are formed of textile materials of greater tensile strength than the reinforcing cords employed in the carcass and the angle which these cords make with respect to the bead base is not less than 20° nor greater than 40 and preferably is in the order of 30°. All of the radially extending carcass reinforcing cords may either terminate on the axially outer sides of the tire or one ply of a multi-ply reinforcement may terminate radially inwardly of the bead cores with the other ply or plies terminating on the axially outer side of the tire. The reinforcing cords in the lower sidewall may be in the form of a single continuous strip folded about the bead core or two separate strips with the cords of like angularity but disposed in opposite directions and with the separate strips located on opposite sides of the bead core. In either case, the innermost of the lower sidewall reinforcing portions should extend radially of the tire sidewall to a location at least as high as the midpoint of the sidewall of the tire with the other of the lower sidewall reinforcing portions extending a lesser distance radially of the sidewall.

In a specific embodiment, the tire preferably comprises a carcass of two radially extending plies, the cords of which are organic textile material with the lower sidewall reinforcing cords extending at bias angles relative to the carcass cords also being formed of organic textile material of greater strength than the carcass cords. The tread reinforcement is preferably formed of wire cords extending in at least two plies at opposite bias angles, the belt having a stiffness such as to resist bending.

BRIEF DESCRIPTION OF DRAWINGS

The invention is illustrated in the accompanying drawings, forming a part of this application, in which.

DETAILED DESCRIPTION OF THE INVENTION

Figure 1:
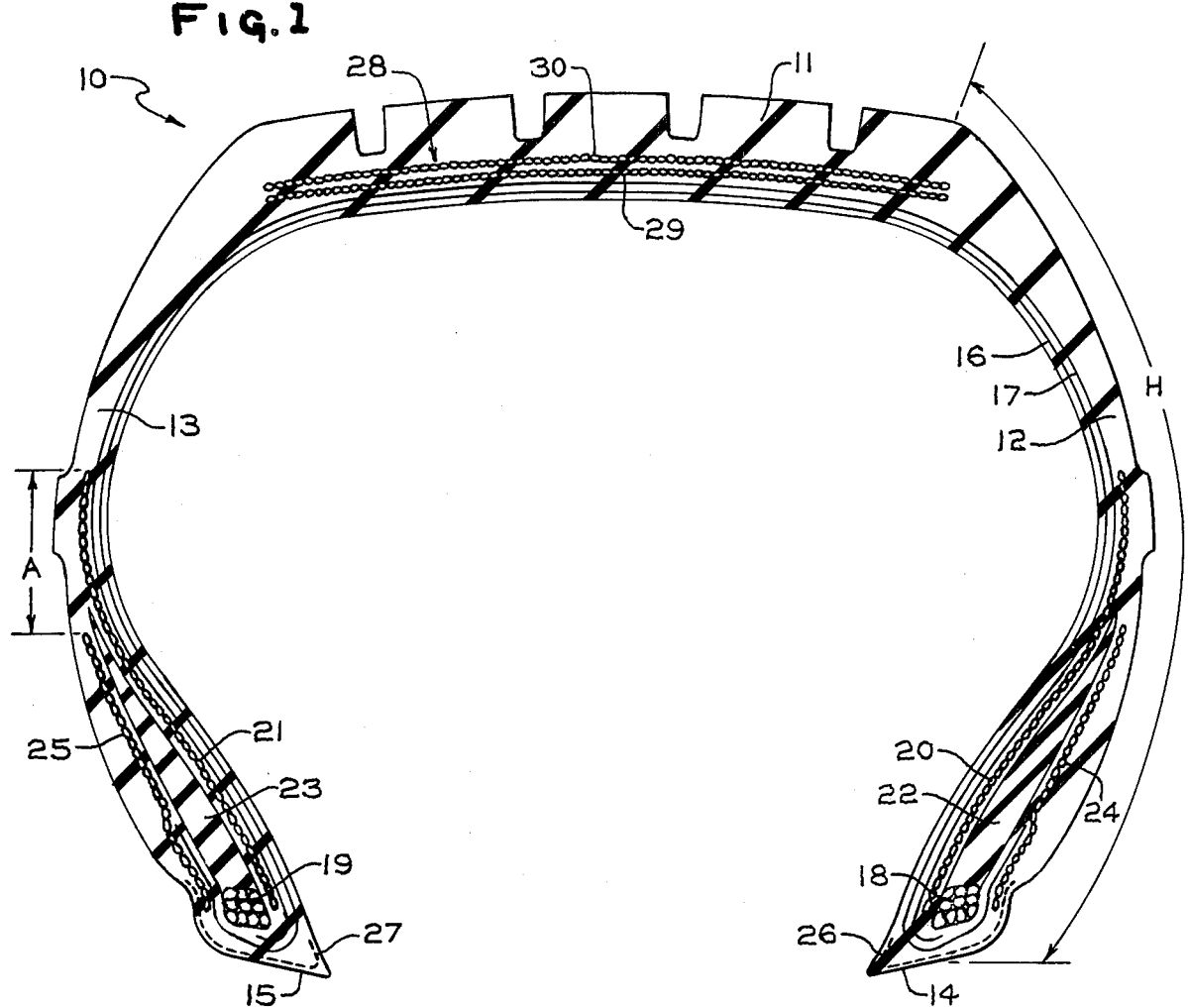
FIG. 1 is a transverse sectional view through a pneumatic tire embodying the invention.

A pneumatic tire 10 suitable for use upon light utility vehicles and incorporating this invention, is illustrated in FIG. 1 as comprising a tread portion 11, provided with a conventional anti-skid pattern. The tread is generally cylindrical in configuration and is united at the shoulders with a pair of convex sidewalls 12 and 13, the radially inner portions of which terminate in spaced beads 14 and 15. The body or carcass of the tire is reinforced with cords or cables extending in radial planes from bead to bead, the cords being disposed in two superposed plies 16 and 17, the terminal or end regions of which are turned axially outwardly of the tire about bead core members 18 and 19. In the construction shown in FIG. 1, the outermost carcass ply 17, terminates beneath the bead cores 18 and 19 while the inner ply 16 extends around the bead cores and terminates a short distance thereabove in the outer, lower sidewall region of the tire.

The lower sidewall regions of the tire 10 are each provided with a first reinforcing portion formed of a sheet or ply, 20 and 21, respectively, of reinforcing cords extending at an acute angle to the base of the beads, 14 and 15, respectively. Each sheet or ply 20, 21 extends from a position between the radial ply 17 and the adjacent bead core 18, 19 to a location at least as high as the midpoint of the tire sidewall and with each sheet or ply 20, 21 in contact with, or closely adjacent, the axially outer surface of the ply 17 throughout the radial extent of the sheet or ply 20, 21.

Filler strips 22, 23 of elastomeric material, generally triangular in cross section, extend from bead cores 18, 19, respectively, with the radially outwardly ends or apices of these strips terminating radially inwardly of the outer edges of the strips or plies 20, 21. The terminal portions of the radial ply 16 extend to the lower axially outer portion of the filler strips 22, 23. Each sidewall also has a second reinforcing portion comprising a sheet or ply 24, 25, respectively, of parallel cords extending at an acute angle relative to the base of the bead and oppositely disposed with respect to the angularity of the cords in the adjacent ply or sheet 20, 21. The sidewalls 12 and 13 are covered with elastomer and the bead regions 14 and 15 may each further include a chafer or finishing strip 26, 27, respectively.

The crown of the tire is provided with a restrictive belt or breaker 28 which, in this instance, comprises two superposed plies 29 and 30 of wire cords. The wire cords in the plies 29 and 30 extend at equal angles, but opposite directions, relative to the circumferential center line of the tire and may be coated with elastomer of different composition from that employed in the carcass and tread.

Figure 2:
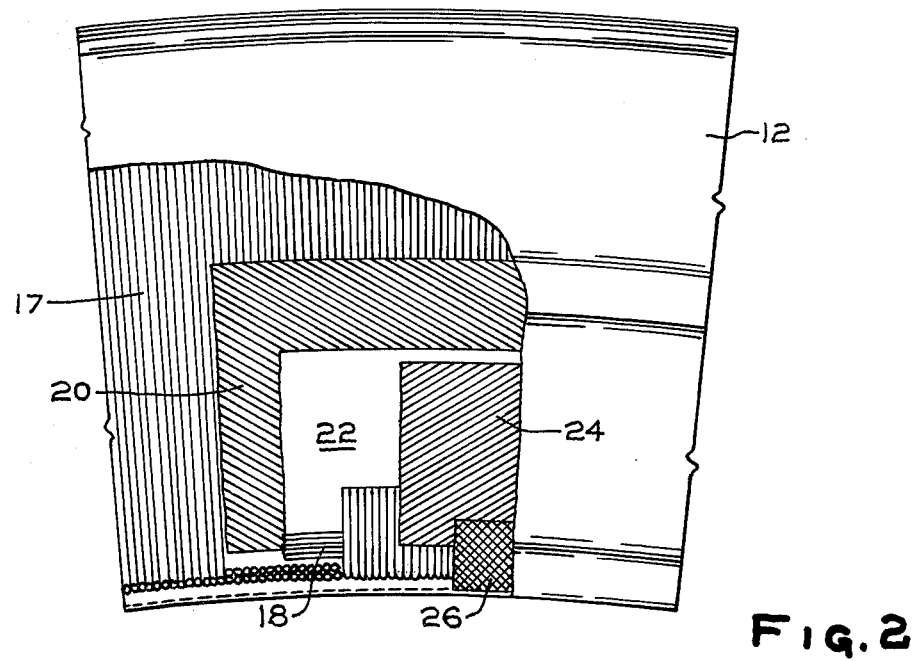
FIG. 2 is a fragmentary side elevation, with parts broken away to different levels, showing the sidewall construction of the tire illustrated in FIG. 1.
Figure 3:
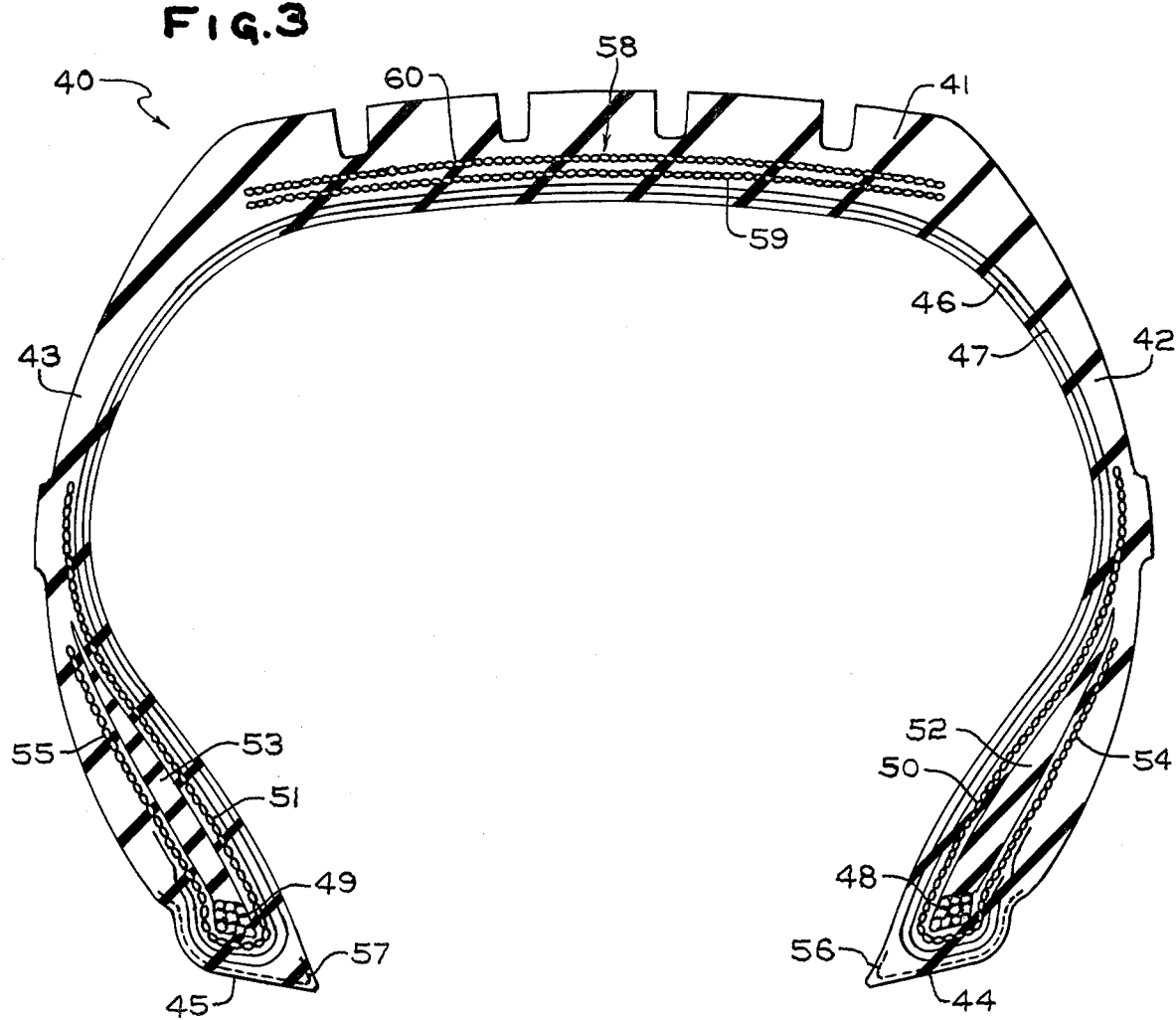
FIG. 3 is a view similar to FIG. 2 illustrating a different embodiment of the invention.

FIG. 3 illustrates another embodiment of the invention which differs from that illustrated in FIGS. 1 and 2 primarily in having the lower sidewall reinforcement disposed in one rather than two portions. As illustrated in FIG. 3, the tire 40 comprises a generally cylindrical tread 41 united with convex sidewalls 42 and 43 which terminate at axially spaced beads 44 and 45 with the body or carcass of the tire reinforced by two plies 46 and 47 of parallel cords extending in generally radial planes of the tire. In this embodiment, the ends or terminal portions of the plies 46 and 47 are both turned outwardly around bead cores 48, 49, respectively, with the end portions of the ply 46 extending radially outwardly in the lower sidewalls a greater distance than the end portions of the ply 47. Each lower sidewall of tire 40 has a reinforcing portion 50, 51, respectively, in the form of a sheet or ply of parallel cords, extending at an acute angle relative to the bead base, in contact with or closely adjacent the outer side of the carcass ply 47, from the bead cores to at least the mid-heighth of the tire sidewall.

Figure 4:
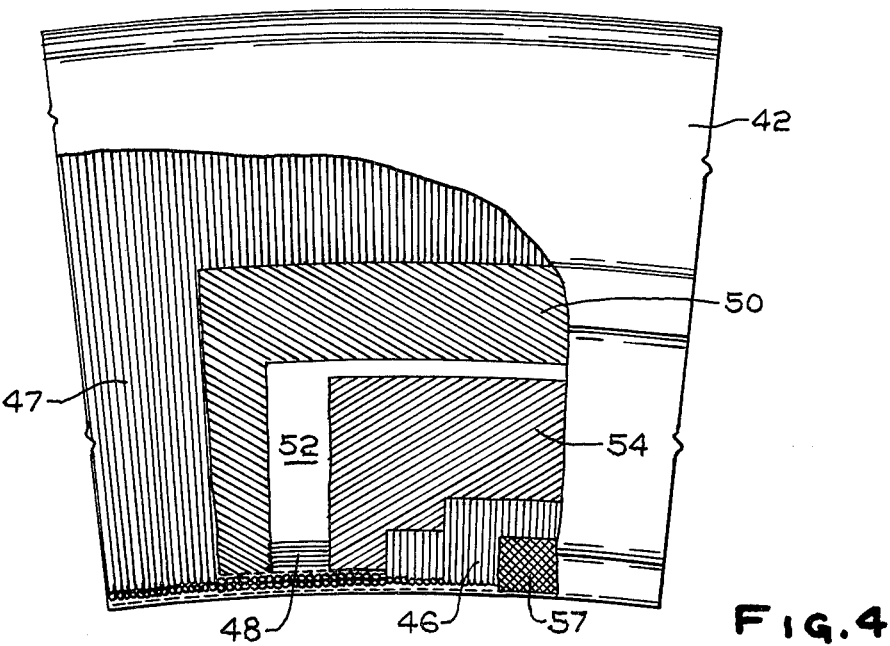
FIG. 4 is a side elevational view similar to FIG. 2 illustrating the sidewall construction of the tire shown in FIG. 3; and, FIG. 5 is a graph illustrating the rim-well stresses for tires constructed in accordance with this invention as compared to conventional radial and bias tires.

Each bead region 44, 45 of the tire is provided with a bead filler strip 52, 53, respectively, formed of elastomeric material generally triangular in cross section with the apex of each filler extending radially in the tire 40 to a location radially inwardly of the radial outer edge of the adjacent reinforcing portion 50, 51. A second sidewall reinforcing portion 54, 55, respectively, comprising parallel cords at an acute angle relative to the bead base, is disposed along the axial outer surface of the adjacent filler strip 52, 53. In this embodiment, the reinforcing portions 54, 55 are respectively integral with the inner reinforcing portions 50 and 51. This is effected by employing in each sidewall a sheet or strip of parallel cords of sufficient width so that it can be folded about a bead core 48, 49, respectively, and filler 52, 53, respectively, with the edges of the folded strip terminating in staggered relationship with respect to each other and the apex of the filler as indicated in FIGS. 3 and 4. The sidewalls of the tire are covered by elastomer and each bead region 44 and 45 may be provided with a chafer strip 56 and 57, respectively.

The crown region of the tire 40 is provided with a restrictive belt 58 formed of at least two plies 59 and 60 of wire cords extending in equal angles, but opposite directions, relative to the circumferential center line of the tire in a manner well understood in the art. The belt plies 59 and 60 may be imbedded in or coated by an elastomer of different modules from that employed for the carcass and/or tread of the tire.

In accordance with this invention, rim stresses of the wheel on which the tire is mounted are reduced by the sidewall reinforcements provided with the bias or angularly extending cords in the sheets or plies 20, 21, 24, 25, or 50, 51, 54 and 55 of the illustrated embodiments. The angularity of these cords relative to the bead base of the tire will vary somewhat depending upon the dimensions of the tire. The maximum cured angle of these cords should, however, not be less than 20° nor exceed 40° and preferably is in the range of 25° to 30° when the tire is of the 875R16.5 size. It is also important that the stiffness of the sheets or plies 20, 21, 24, 25 and 50, 51, 54 and 55 be greater than that of the carcass cord plies 16 and 17. This stiffness, in the direction of the length of the cords, should not be less than $7.0 \times 10^4$ psi, and preferably should be in the neighborhood of $7.85 \times 10^4$ psi for an 875R16.5 tire.

By way of example but not limitation, the bias reinforcements may be a weftless fabric comprising twenty-six cords per inch of polyamide with each cord formed of two strands of 1680 denier. The carcass plies may then be formed of rayon cords of somewhat lesser end count with each formed of two 1650 denier yarns. The belt plies 29, 30 or 59, 60 should preferably have cured cord angles in the order of 25° and not greater than 30° while the stiffness of these plies in the direction of the length of the cords should not be less than $3.0 \times 10^6$ psi, with this parameter being in the range of $3.95 \times 10^6$ psi for a tire of the 875R16.5 size.

The bead fillers, such as 22, 23 and 52, 53 should be of high modulus elastomer, i.e. of higher modulus than the elastomer covering the tire sidewalls. Preferably the fillers have a Young's modulus at 10% elongation of not less than 700 psi, to ensure carcass durability although the value of the modulus is not significant with respect to the rim stresses exerted by the tire.

The maximum distance that the radially outer edge of the axially inner sidewall reinforcing portion, such as 20, 21 or 50, 51, extends into the tire should be 0.6H, where H is the radial dimension of the sidewall which is defined as the distance from the nominal rim diameter of the tire to the intersection of the tread and sidewall transverse arcs, see FIG. 1. The minimum radial extent for this component should be 0.25H. The stepoff, or distance from the radially outer edge of the reinforcing portion such as 20, 21, 50 and 51 to the radially outer edge of the axially outer reinforcing strip or portions 24, 25, 54 and 55, can be defined as the distance A, with A for a tire of the 875R16.5 size being between 0.5 and 1.25 inches (1.27 to 2.18 cm.), see FIG. 1.

The radial extent of the bias angle sidewall reinforcing portions and the angularity of the cords thereof will vary somewhat with the size and cross sectional profile of the tire. In general, the cord angle should not be less than 20°, for a strip which extends 30% of the distance H, nor more than 40° for a strip which extends 60% of the distance H. By way of specific example, the axially inner of such strips for an 875R16.5 tire had a cord angle of 30° and a radial extent of 0.5H.

It is also important that both of the axially inwardly disposed reinforcing portions 20, 21 or 50, 51 lie in contact with or closely adjacent the radially outer carcass ply such as 17 or 47, and that the carcass plies 16, 17 or 46, 47 not be separated in the bead regions of the tire as is sometimes done by placing them on opposite sides of the bead cores and/or filler strips.

The improvement achieved by this invention can be seen with reference to FIG. 5, which is a graph of rim stress relative to angular distance about the rim from the portion aligned with the center of contact with the road of a tire mounted on the rim. As shown therein, the curve passing through the small rectangles shows the stresses imposed upon a wheel rim by a conventional bias carcass tire; the curve passing through the small circles shows the stresses of a radial carcass tire without the lower sidewall reinforcements of this invention; and the curve extending through the small triangles indicates the stresses imposed by a tire of the same size having a radial carcass, but with the improved sidewall reinforcements as described above. It will be observed that the invention has resulted in a lowering of the maximum rim-well stress and increasing the arcuate distribution thereof from those imposed by the conventional radial tire to a value which is intermediate that experienced with such conventional radial tire and the conventional bias carcass tire. This improvement is sufficient to eliminate the excessive wheel rim stresses so that wheel rims designed for use with bias carcass tires can now be safely used with the improved radial carcass tires.

Maximum improvement is achieved when the lower sidewall regions not only contain the sheets or strips of cords extending at opposite bias angles, but also have all radially extending carcass ply reinforcements turned axially outwardly and with these reinforcements closely adjacent each other and to the axially inner of the angularly extending lower sidewall reinforcements. It is also desirable that the tire have the belt in the crown region of a stiffness such that it resists bending.

Although the invention has been described in considerable detail, with respect to two embodiments, and dimensional details of preferred embodiments have been given, it will be understood that variations may be made from the details herein provided, the scope of the invention being defined in the appended claims.

We claim:

1. A pneumatic tire comprising a generally toroidal carcass including a generally cylindrical crown portion and a pair of convex sidewalls terminating in axially spaced beads with each bead including an annular bead core, the said carcass reinforced by generally radially extending reinforcing cords surmounted in the crown region by a substantially inextensible belt formed of at least two plies of parallel cords extending at an angle to the circumferential centerline of the tire, and with the sidewalls and crown portions of the carcass covered by elastomer, characterized in that each sidewall includes first and second annular reinforcing portions formed of cords extending respectively at opposite acute angles relative to the circumference of the base of the adjacent bead with an annular filler of elastomer, generally triangular in cross section, positioned between said portions adjacent the bead core and extending into the tire sidewall to a location intermediate the radially outer edges of the said portions, the end regions of all of said radially extending cords being turned axially outwardly.

2. A pneumatic tire, as defined in claim 1, wherein at least some of the said radially extending cords terminate radially inwardly of the said bead cores and others of said radially extending cords terminate in the lower sidewalls intermediate the said fillers and the radially outer of said portions.

3. A pneumatic tire, as defined in claim 1, wherein each of the said first reinforcing portions is closely adjacent the axially outer of said radially extending cords and extends from the adjacent bead core radially in the carcass sidewall to a location that is approximately at the midpoint of the sidewall of the tire.

4. A pneumatic tire, as defined in claim 1, wherein each of the said second reinforcing portions extends from the adjacent bead core radially outwardly of the carcass closely adjacent the axially outer surface of the bead filler with the radially outer edge of said second portion terminating radially inwardly from the outer edge of the said first of the portions a distance in the range of 0.5 to 1.25 inches.

5. A pneumatic tire, as defined in claim 1, wherein the angles of the cords in said first and second reinforcing portions are in the range of 25° to 40°.

6. A pneumatic tire, as defined in claim 1, wherein the elastomer of said annular filler has a higher modulus than the elastomer covering the tire sidewalls.

7. A pneumatic tire, as defined in claim 1, wherein the radially extending cords and the cords of said first and second reinforcing portions are formed of an organic textile substance.

8. A pneumatic tire, as defined in claim 1, wherein the cords of said first and second reinforcing portions are twisted filaments of polyamide.

9. A pneumatic tire, as defined in claim 1, wherein said first and second reinforcing portions in each sidewall are integral parts of a single strip.

10. A pneumatic tire, as defined in claim 1, wherein said first and second reinforcing portions in each sidewall are separate strips.

11. A pneumatic tire, as defined in claim 1, further comprising a finishing strip in each bead extending across the base thereof and radially outwardly in the sidewall axially outwardly and in overlapping relationship to the radially inner edge of the said second reinforcing portion.

12. A pneumatic tire comprising a generally toroidal carcass including a generally cylindrical crown portion and a pair of convex sidewalls terminating in axially spaced beads with each bead including an annular metallic bead core, said carcass being reinforced by at least two plies of generally radially extending textile reinforcing cords surmounted in the crown region by a substantially inextensible belt formed of at least two plies of metallic cords with the cords in each of said belt plies extending at equal and opposite acute angles relative to the circumferential center line of the tire and with the sidewalls and crown portion of the carcass covered by elastomer, characterized in that each sidewall includes first and second annular strips of textile reinforcing cords extending respectively at opposite acute angles relative to the base of the adjacent bead, there being an annular filler of elastomer between said strips, the said filler being generally triangular in cross section with the base thereof adjacent the radially outer surface of the bead core and the apex of the filler extending into the tire sidewall to a location intermediate the radial outer edges of said strips, the outer of the carcass plies terminating in each sidewall radially inwardly of the bead core therein and the inner of the carcass plies extending over the axially outer face of the adjacent bead core and the lower portion of the annular filler with the radially inner edge of the said second strip disposed axially outwardly of the said edge of the inner carcass ply and with the radially outer edge of said second strip terminating adjacent to but radially inwardly from the apex of said filler.

13. A pneumatic tire comprising a generally toroidal carcass including a generally cylindrical crown portion and a pair of convex sidewalls each terminating in an axially spaced bead with each bead including an annular metallic bead core, said carcass being reinforced by at least two plies of generally radially extending textile reinforcing cords surmounted in the crown region by a substantially inextensible belt formed of at least two plies of metallic cords with the cords in each of said belt plies extending at equal and opposite acute angles relative to the circumferential centerline of the tire and with the sidewalls and crown portion of the carcass covered by elastomer, characterized in that each bead core has an annular strip of textile reinforcing cords folded thereabout with the axially inner portion of said strip extending radially to a location adjacent the midpoint of the sidewall of the tire, an annular filler of elastomer within each said strip, the said filler being generally triangular in cross section with the base thereof adjacent the radially outer surface of the bead core and the apex of the filler extending into the tire sidewall to a location intermediate the radial outer edges of the said strip, the reinforcing cords of each said strip extending at an acute angle relative to the base of the adjacent bead, and all of the carcass plies being turned axially outwardly of the bead cores with at least one of the carcass plies extending radially outwardly of the bead cores to a location radially inwardly of the radially outer edges of the axially outwardly portions of the said strips.

* * * * *